United States Patent [19]
Pigg

[11] Patent Number: 5,487,247
[45] Date of Patent: Jan. 30, 1996

[54] VENTILATED ROOF AND WALL STRUCTURE

[76] Inventor: Willard L. Pigg, 1080 N. Brace Rd., Summertown, Tenn. 38483

[21] Appl. No.: 273,487
[22] Filed: Jun. 11, 1994
[51] Int. Cl.⁶ .............................. E04F 17/04; F24F 7/00
[52] U.S. Cl. .............................. 52/302.3; 52/95; 52/199; 52/302.1; 454/185; 454/260; 454/358
[58] Field of Search ........................ 52/95, 169.5, 198, 52/199, 302.1, 302.3, 302.4; 454/185, 260, 358, 365

[56] References Cited

U.S. PATENT DOCUMENTS

| | | | |
|---|---|---|---|
| 3,124,847 | 3/1964 | Charniga, Jr. | 52/198 |
| 3,223,018 | 12/1965 | Tucker, Sr. | 454/365 X |
| 3,343,474 | 9/1967 | Sohda et al. | 454/185 |
| 3,368,473 | 2/1968 | Sohda et al. | 454/185 |
| 4,159,673 | 7/1979 | Weirich | 454/260 |
| 4,200,034 | 4/1980 | Listle et al. | 454/260 X |
| 4,295,415 | 10/1981 | Schneider, Jr. | 454/185 |
| 4,393,633 | 7/1983 | Charniga | 454/185 X |
| 4,635,419 | 1/1987 | Forrest | 454/185 X |
| 4,677,903 | 7/1987 | Mathews, III | 454/185 |
| 4,760,773 | 8/1988 | Pezzulli | 454/358 |

Primary Examiner—Carl D. Friedman
Assistant Examiner—Kevin D. Wilkens

[57] ABSTRACT

A ventilated roof and wall structure wherein a base roof plate is spaced from a top roof plate defining a roof air gap, such that a base roof plate slide plate is slidably mounted to permit selective communication of an attic spaced relative to the air gap, wherein the roof structure terminates in an air tube at a peak portion of the roof structure, and the vent tube is open at each end and includes at least one vent pipe to vent trapped air in the roof air gap receiving such air from the attic space and air flow from the walls to assist air flow throughout the roof air gap and assist in ventilation of the structure minimizing heat buildup within the associated dwelling.

2 Claims, 6 Drawing Sheets

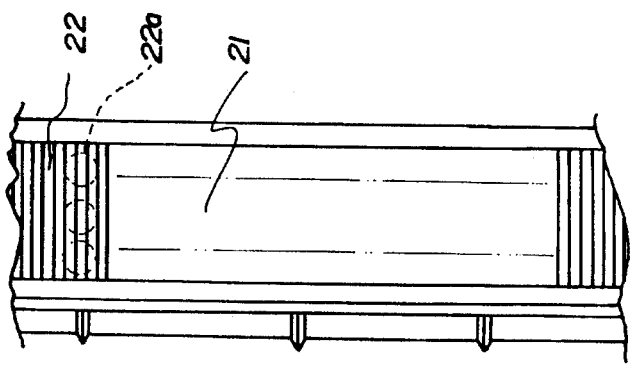
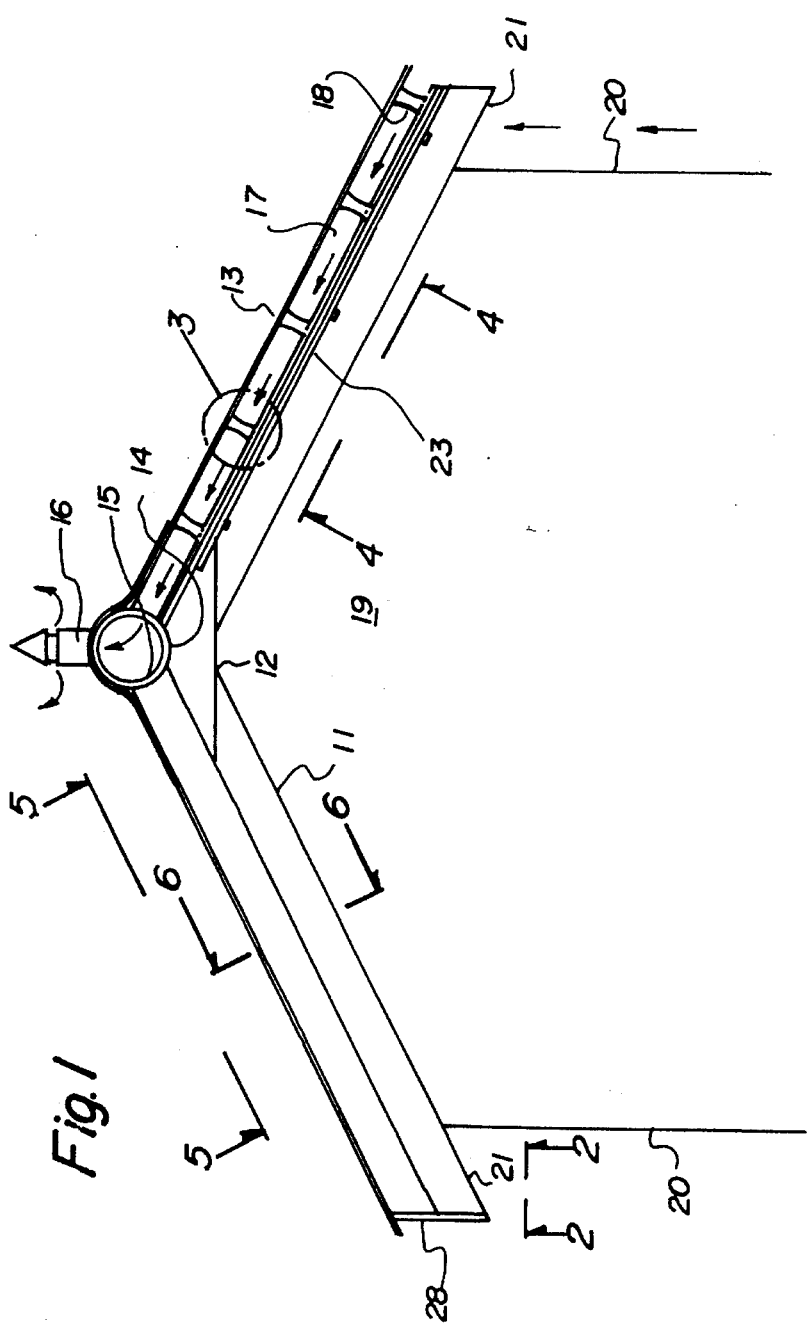

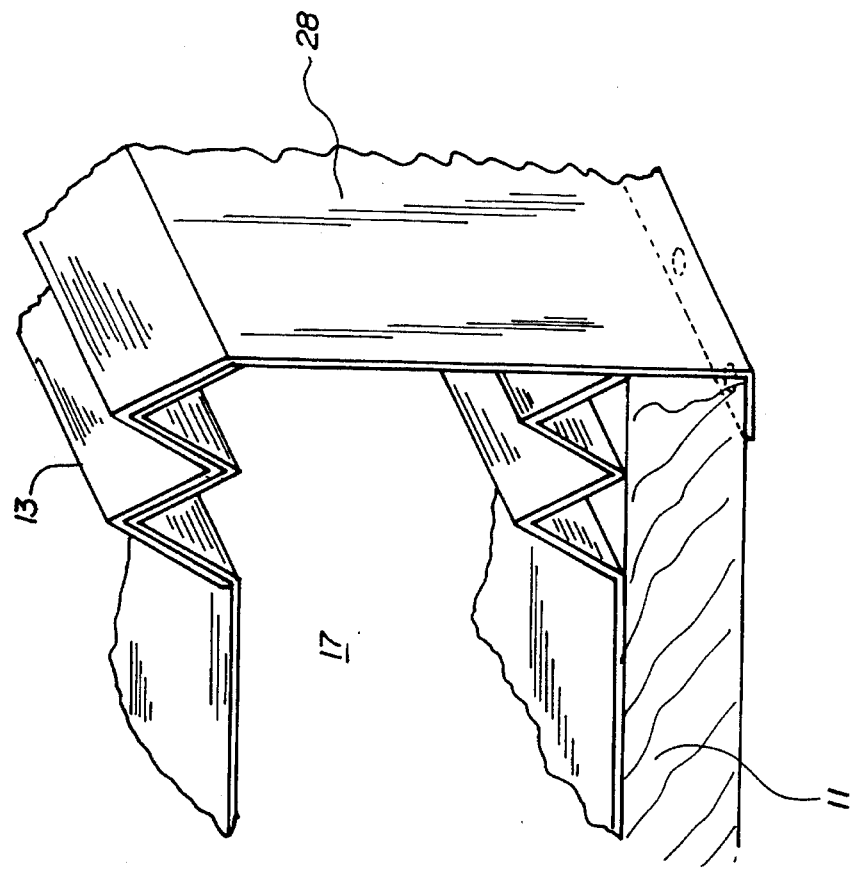
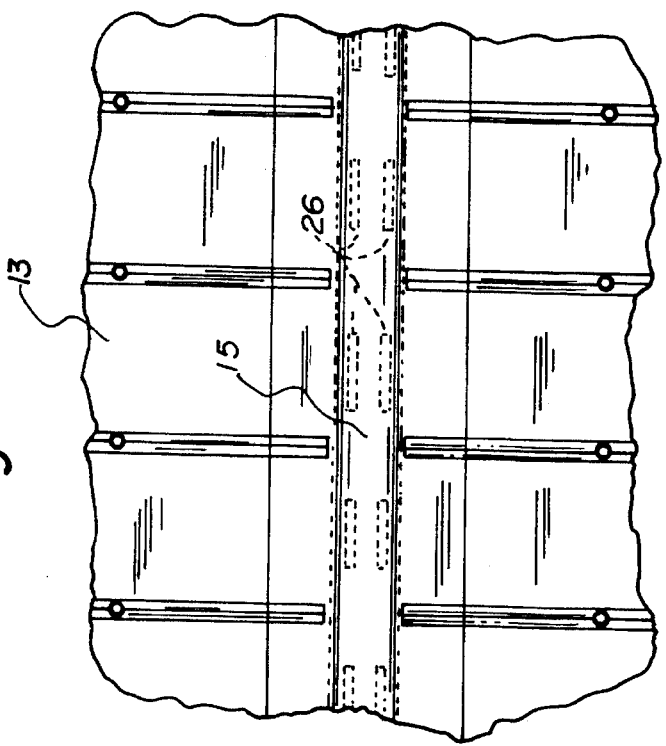

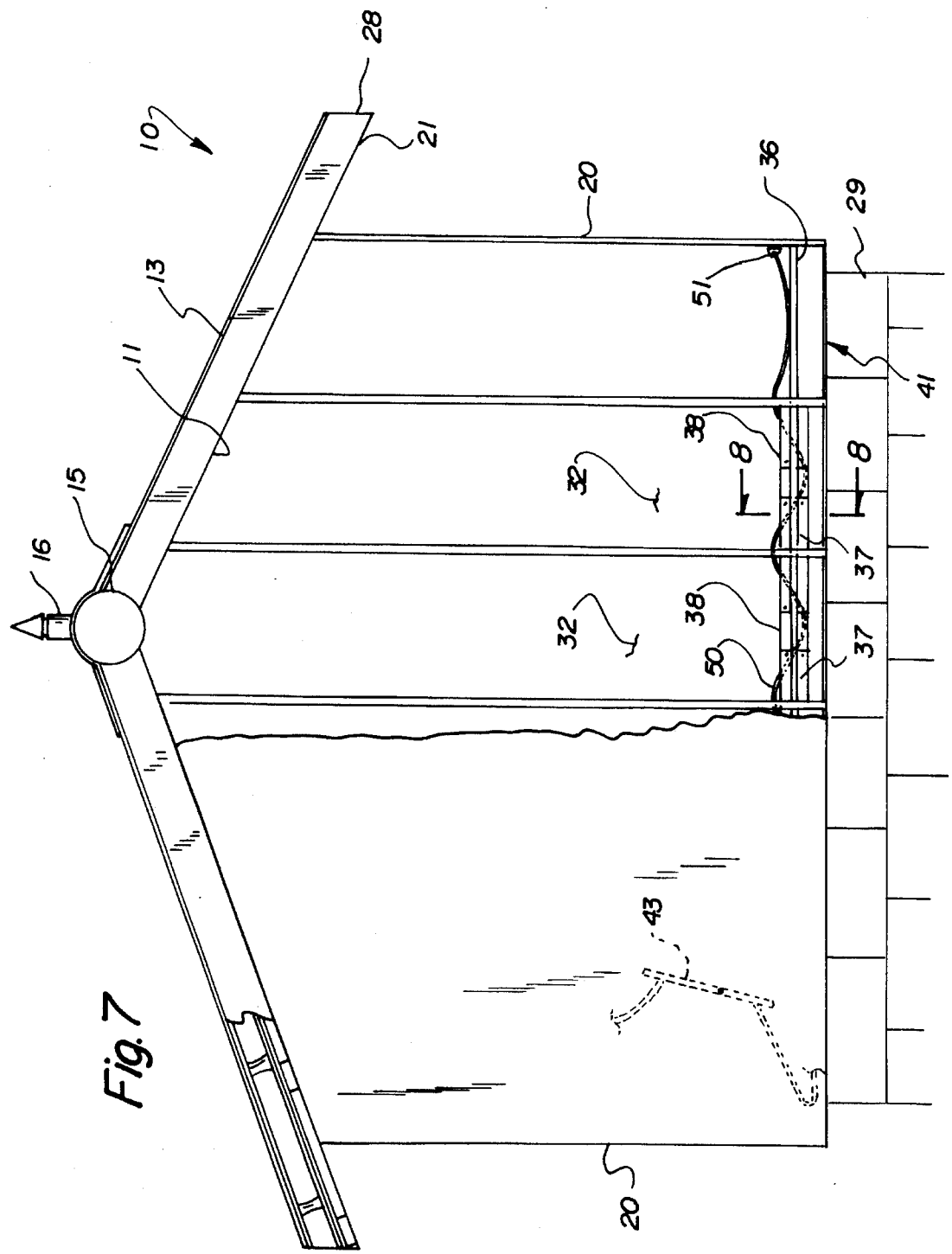

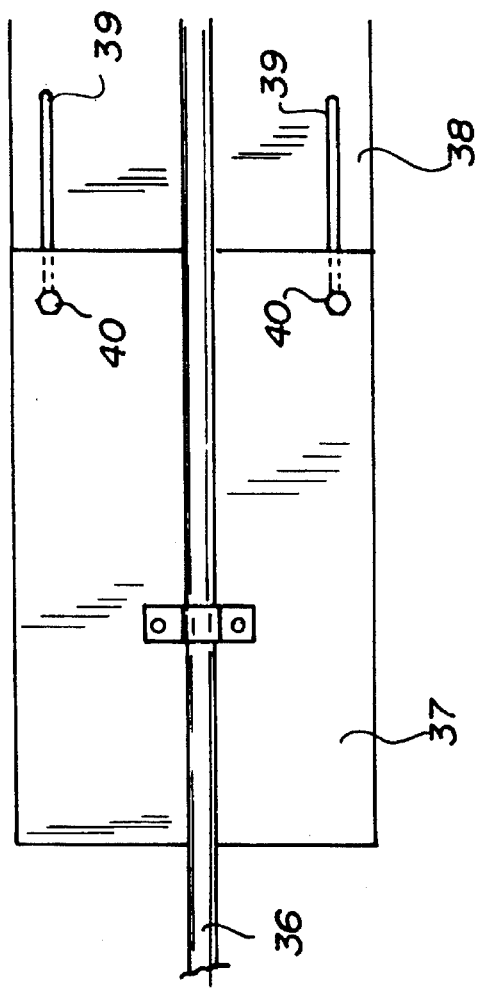
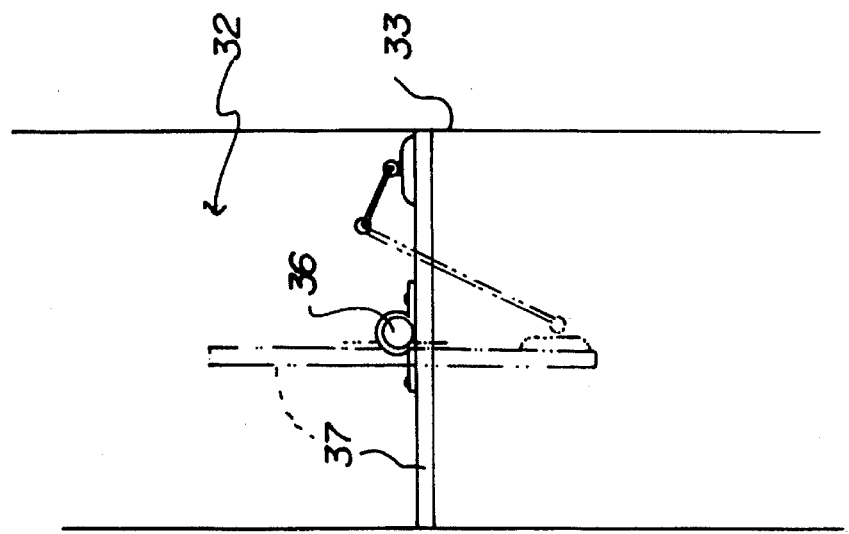

VENTILATED ROOF AND WALL STRUCTURE

TECHNICAL FIELD

The field relates to ventilated roof structure, and more specifically to a roof and wall structure to permit ventilation of a roof relative to a dwelling permitting escape of heated air from that dwelling.

BACKGROUND OF THE INVENTION

Ventilated roof structure of various configurations have been employed in the prior art in a manner as exemplified by U.S. Pat. No. 4,660,463 wherein at least one channel of air flow is provided in the organization.

U.S. Pat. No. 5,094,041 sets forth a ridge cap having a ventilation opening directed therealong spanning a portion of the roof peak bringing ventilation of air relative to the dwelling.

U.S. Pat. No. 4,852,314 sets forth a ventilation and insulation panel arranged for mounting to a roof structure of fixed construction, wherein U.S. Pat. No. 4,852,311 sets forth a roof organization having overhang and ventilation channel structure mounted coextensively of the roof between the base roof and a top roof portion.

SUMMARY OF THE INVENTION

The present invention relates to ventilation roof and wall structure wherein a coordinated roof and wall structure provides various closure plates permitting ventilation of the roof relative to the attic and the directing of air through the wall structure relative to the roof as required.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an orthographic diagrammatic view of the ventilated roof structure.

FIG. 2 is an orthographic view, taken along the lines 2—2 of FIG. 1 in the direction indicated by the arrows.

FIG. 5 is an orthographic view, taken along the lines 5—5 of FIG. 1 in the direction indicated by the arrows.

FIG. 6 is an orthographic view, taken along the lines 6—6 of FIG. 1 in the direction indicated by the arrows.

FIG. 7 is an orthographic view, partially in section, indicating a ventilated wall structure relative to an overhang of the wall relative to the foundation wall.

FIG. 8 is an enlarged orthographic view, taken along the lines 8—8 of FIG. 7.

FIG. 9 is an enlarged orthographic view of the plate structure relative to the wall overhang.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. therefore, specific structural and functional details disclosed herein are not to be interpreted as limiting, but merely as a basis for the claims and as a representative basis for teaching one skilled in the art to variously employ the present invention in virtually any appropriately detailed structure.

Figure 3:
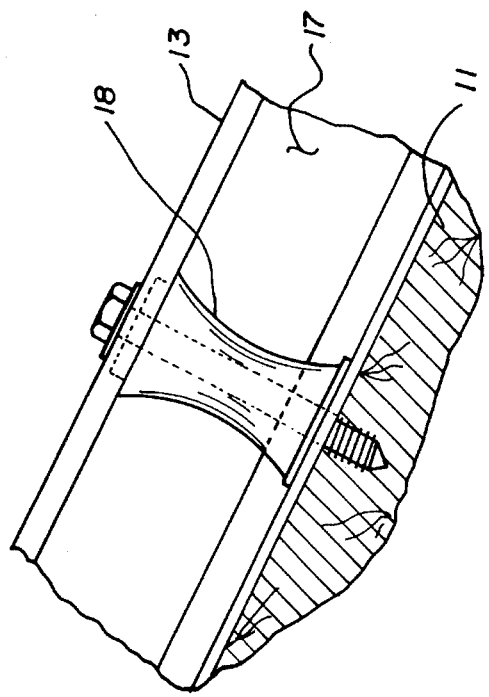
FIG. 3 is an enlarged orthographic cross-sectional view of section 3 as set forth in FIG. 1.
Figure 11:
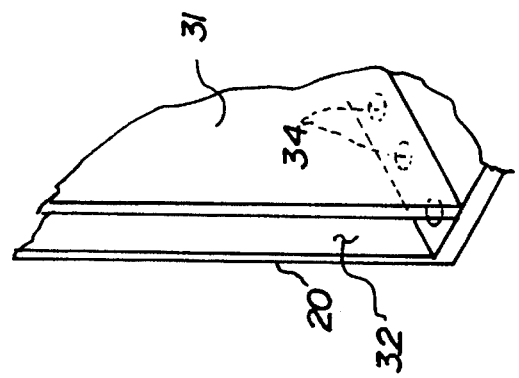
FIG. 11 is an isometric illustration and partial view of an overhang nil absent a foundation such as found in "mobile homes".

The roof and wall structure 10 is coordinated in a manner such as indicated in FIG. 7 to direct ventilation through the walls and roof structure of an existing dwelling. A roof structure, as indicated in FIG. 1, has a base roof plate 11 spaced from a top roof plate 13. A base roof plate peak ridge 12 is spaced from a top roof plate peak ridge 14 that is coextensively accommodated by an air tube 15 having openings at each end that are typically screened and if desired, canted to minimized introduction of rainfall and the like therewithin. At least one vent pipe 16 is in pneumatic communication with the air tube 15 to direct air therefrom. Along the air tube 15 are a series of attic vents 26 (see FIG. 5) to provide for pneumatic communication and air flow between attic space 19 of the dwelling structure and the air tube 15. A roof air gap 17 (see FIGS. 1 and 3 for example) is defined between the base roof plate 11 and a top roof plate 13, wherein spacer spools 18 (see FIG. 3) provide for the rigid spacing of the base roof plate 11 relative to the top roof plate 13.

Dwelling exterior walls 20 are oriented such that there is a base roof plate overhang 21 extending beyond the exterior walls 20, such that an overhang vent grill 22 (see FIG. 2) directs air into the roof air gap 17. To this end, an overhang vent grill 22 is provided permitting air flow into spaced rows of openings 22a, as exemplified in FIG. 2. The openings may be of whatever dimensions may be desirable, wherein typically they may be rows of three inch holes, with each row of such holes spaced apart eight inches relative to one another. It should be understood that this dimensioning is for purposes of illustration and is not to be limiting relative to the instant application. Further, relative to such dimensions, these openings may be oriented four inches from the edge and relative to the overhang, may be eighteen inches and beginning sixteen inches from the end of the eave or overhang portion of the roof, but again such dimensions are for example and not limiting.

Figure 4:
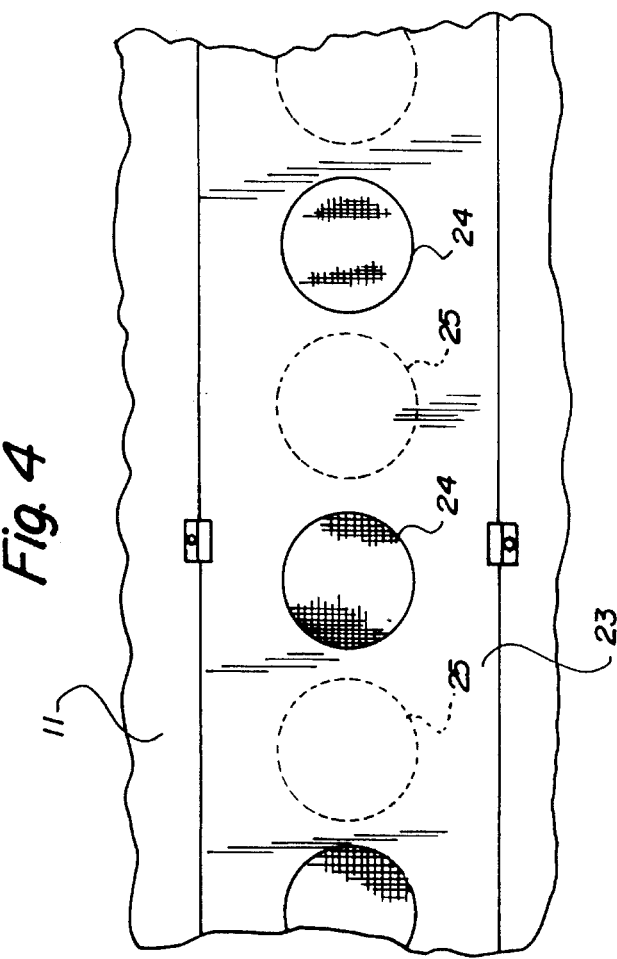
FIG. 4 is an orthographic view, taken along the lines 4—4 of FIG. 1 in the direction indicated by the arrows.

The FIG. 4 also indicates the use of a slide plate 23 (see FIG. 1 and FIG. 2). The slide plate permits ventilation of the attic space 19 to the roof air gap 17, such that the slide plate 23 is formed with a row of screen openings 24 selectively aligned with individual base roof plate openings 25 that are in communication between the slide plate 23 and the roof air gap 17. The slide plate 23 may be manipulated either manually in the roof or by the use of a cable and 1ever arrangement, as indicated in FIG. 7, by the numeral 43. Details of such are to be understood that the cable directed to the slide plate 23 is manipulated upon pivoting of the associated lever structure as example only of a manner of manipulating the slide plate 23. It is also understood that various other means such as electromechanical, electrical, pneumatic, and manual displacement of the slide plate 23 is available to one of ordinary skill in the art in use of the invention. The FIG. 6 indicates the use of a roof end cover 28 extending coextensively about the periphery of the roof structure between the base plate 11 and the top roof plate 13 to enclose the associated roof air gap 17.

Figure 10:
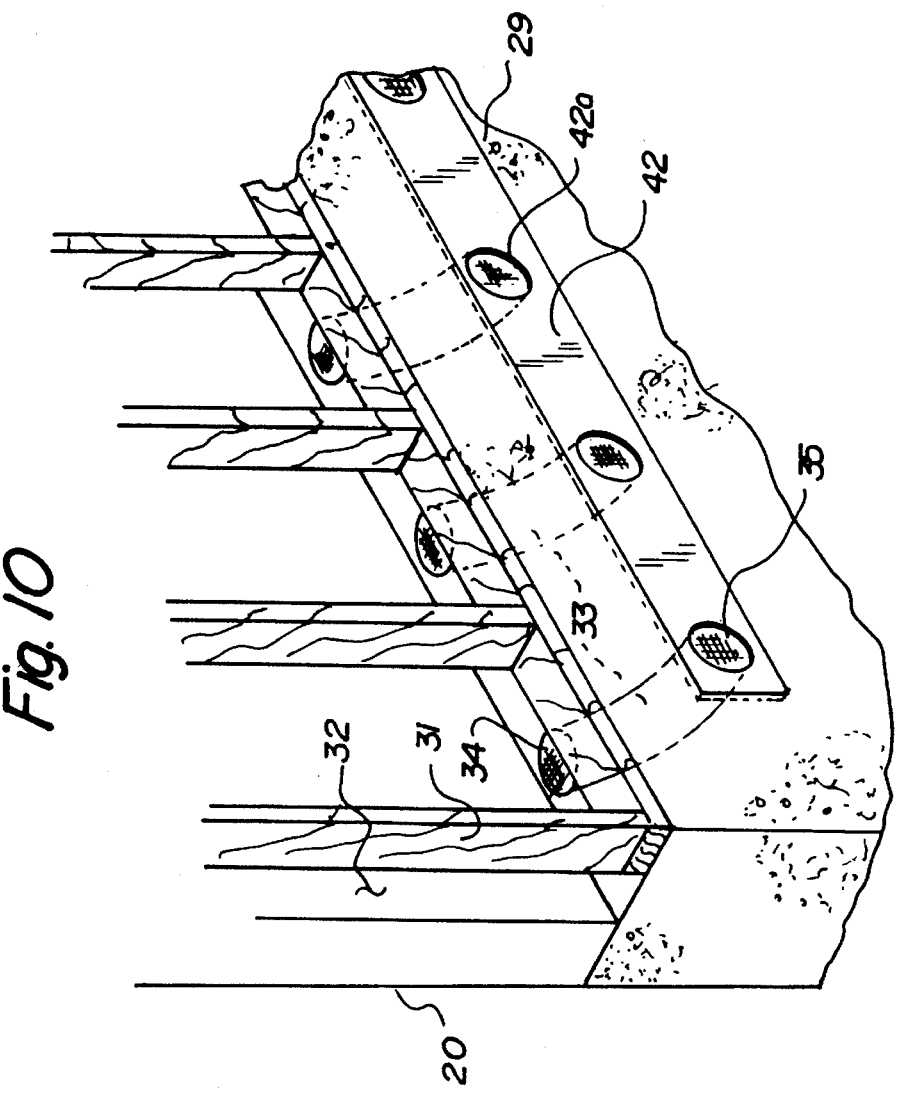
FIG. 10 is an enlarged isometric illustration indicating an alternative manner of ventilating the wall air gap relative to the foundation wall.

FIG. 10 indicates the outer wall structure 20 indicating the wall studs, such that extending through the floor are a series of outlet openings 34. In the case such as in FIG. 7 where there is a wall overhang 41 relative to a foundation wall 29, that is the outer wall extends beyond the foundation wall, the outer wall may have a series of closure plates having a first closure plate 37 mounted relative to a second closure plate 38 that are slidable relative to one another so as to adjust to a desired wall stud spacing and pivotal about an axle 36 to permit air flow into the outer wall and specifically to a wall air gap 32 defined between an inner wall 31 and the outer wall 30 (see FIG. 10). In this manner, the closure plates 37 and 38 are slidable relative to one another to adjust to the particular spacing between adjacent wall studs, wherein slots 39 are directed into the second closure plate 38 guided by guide lugs 40 mounted to the first closure plate 37. The closure plates 37 and 38 are coupled to the axle 36 so as to rotated within the wall air gap 32 to regulate a flow of air therethrough. To effect remote adjustment or pivoting of the closure plates 37 and 38 within the outer wall structure 20, a cable 50 extends through unlabeled cable apertures in the wall studs and is coupled to one of the closure plates 37 or 38 in an offset position relative to the axle 36. A first end of the cable 50 is secured to a portion of the outer wall structure 20 as at 51 in FIG. 7. By this structure, a tensioning of the cable 50 will effect rotation of the closure plates 37 and 38 from the position illustrated in phantom lines within FIG. 8 to the position illustrated in solid lines therein. The FIG. 10 notes that where there is no overhang, the use of wall vent conduits 33 are directed through the foundation wall terminating in inlet openings 35, wherein a foundation wall slide plate 42 may be slidable to permit the use of foundation wall slide plate openings 42a to align with the inlet openings 35 to direct air flow into the wall air gap 32 and ultimately direct such air flow through the wall air gap 32 into the attic 19 and subsequently to the roof air gap 17.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A ventilated roof structure comprising:

a dwelling having at least one exterior side wall and at least one interior side wall and a plurality of wall studs extending between the exterior side wall and the interior side wall, the stud each having a cable aperture directed therethrough;

a base roof plate extending over the exterior side wall and the interior side wall, the base roof plate having a base roof peak ridge;

a top roof plate fixedly secured in a spaced relationship relative to the base roof plate to define a roof air gap extending between the base roof plate and the top roof plate, the top roof plate having a top roof plate peak ridge;

an air tube mounted and fixedly secured coextensively relative to the base roof plate peak ridge and the top roof plate peak ridge, the air tube having at least one vent pipe projecting exteriorly of the dwelling and the top roof plate, the vent pipe being in pneumatic communication with the air tube, and the air tube being in pneumatic communication with the roof air gap;

an attic space within the dwelling positioned in adjacency to the base roof plate, with a plurality of attic vents extending between the attic space and the air tube;

a foundation wall, the exterior side wall being secured to the foundation wall, the foundation wall including at least one vent conduit, and the exterior side wall and the interior side wall being spaced apart to define a wall air gap, the vent conduit extending into the wall air gap and terminating in an outlet opening, the vent conduit directed through the foundation wall terminating in an inlet opening;

an axle rotatably mounted between the exterior side wall and the interior side wall;

at least one closure plate positioned within the exterior side wall and the interior side wall, the closure plate being mounted to the axle;

a cable extending through the cable apertures in the wall studs, the cable being coupled to the closure plate in an offset position relative to the axle, with a first end of the cable being secured to a portion of the dwelling, whereby a tensioning of the cable will effect rotation of the closure plates to regulate a flow of air between the exterior side wall and the interior side wall.

2. The ventilated roof structure of claim 1, wherein the base roof plate includes a slide plate slidably mounted to the base roof plate, the slide plate having at least one screen opening directed therethrough, and the base roof plate having at least one base roof plate opening, with the slide plate slidably mounted to permit selective communication of the screen opening in coextensive overlying communication, with the base roof plate opening and the base roof plate opening in pneumatic communication between the attic space and the roof air gap.

\* \* \* \* \*